March 19, 1935. W. BISHER 1,995,238
SAND TRAP
Filed July 5, 1934 4 Sheets-Sheet 3

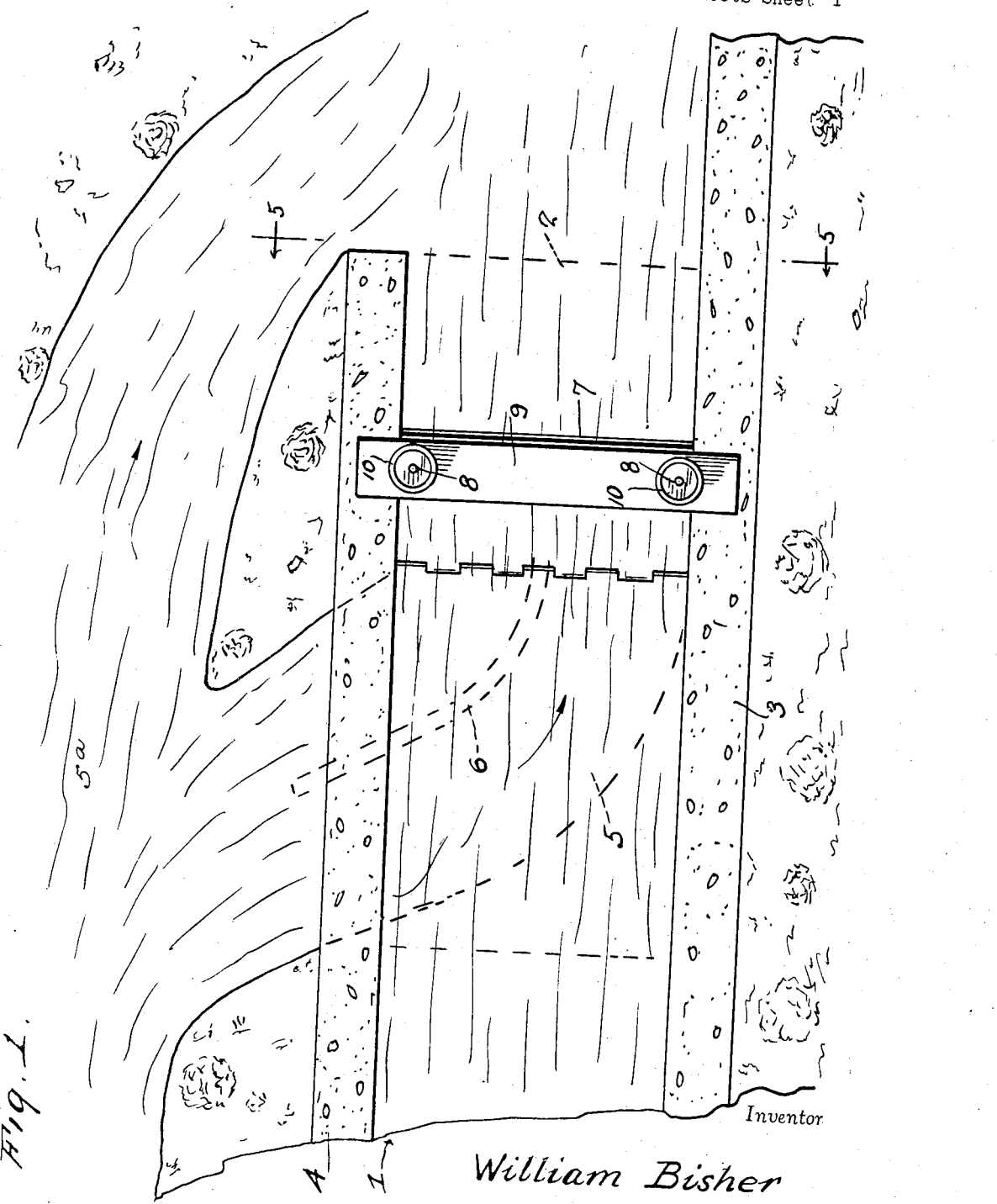

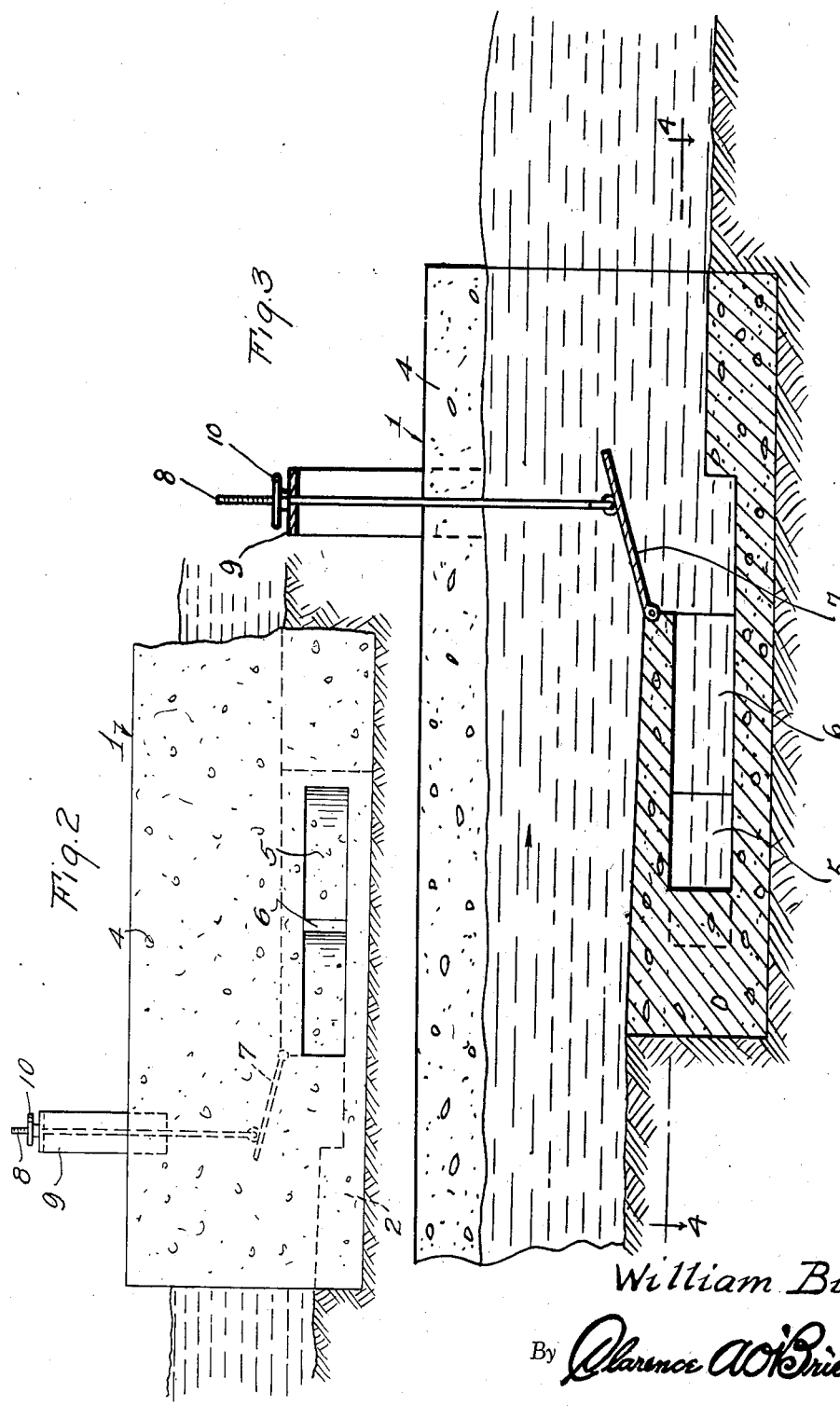

Inventor
William Bisher
By Clarence A. O'Brien
Attorney

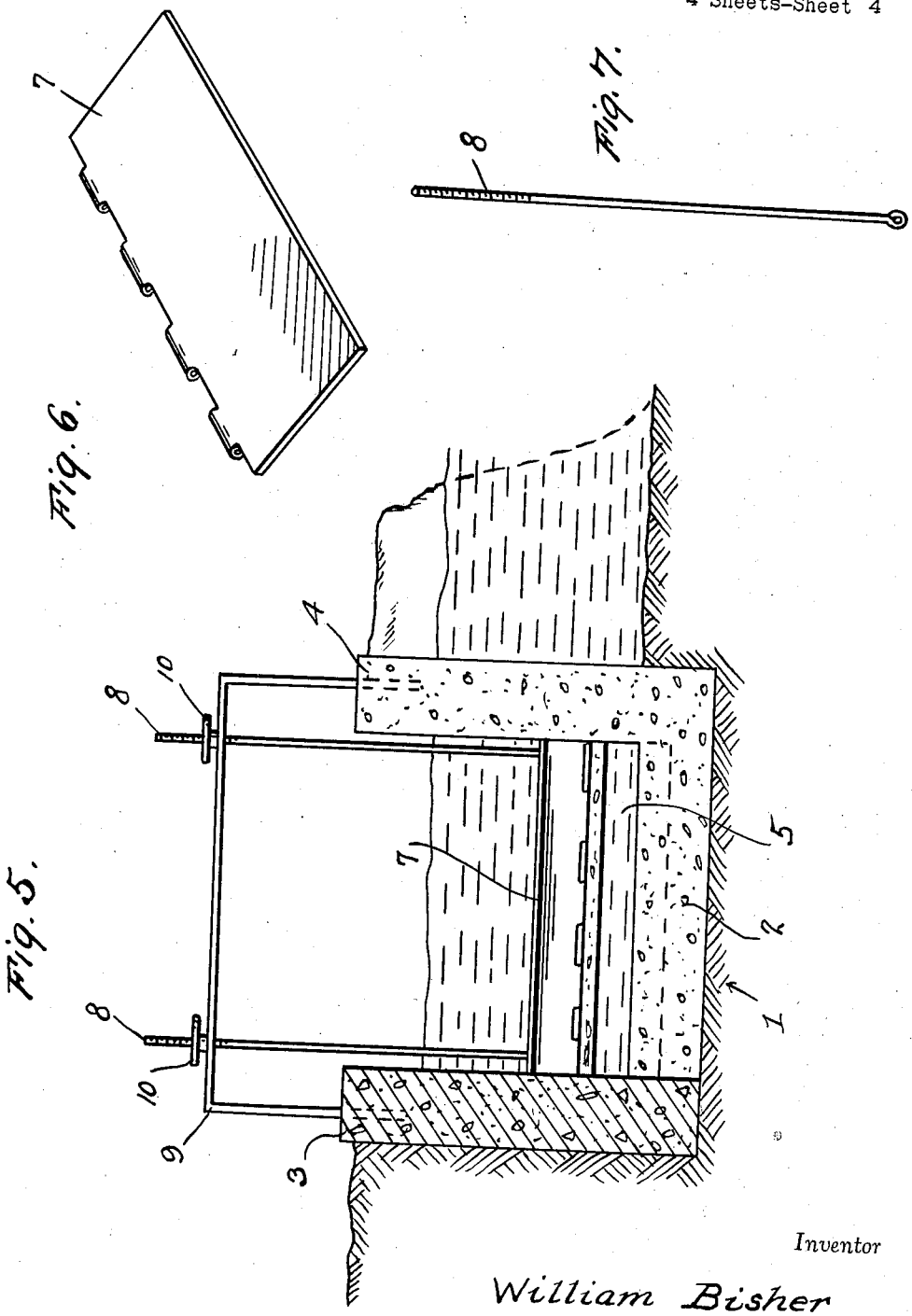

Patented Mar. 19, 1935

1,995,238

UNITED STATES PATENT OFFICE 1,995,238

SAND TRAP

William Bisher, Sargent, Nebr.

Application July 5, 1934, Serial No. 733,932

1 Claim. (Cl. 61—2)

The present invention relates to new and useful improvements in sand traps and has for its primary object to provide, in a manner as hereinafter set forth, a device of this character embodying a novel construction, combination and arrangement of parts through the medium of which sand may be kept out of irrigation ditches, canals, power plant races, etc.

Other objects of the invention are to provide a sand trap of the aforementioned character which will be comparatively simple in construction, strong, durable, highly efficient and reliable in use, and which may be constructed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in top plan of a sand trap constructed in accordance with the present invention.

Figure 2 is a view in side elevation thereof.

Figure 3 is a view in vertical longitudinal section through the invention.

Figure 5 is a view in vertical transverse section, taken substantially on the line 5—5 of Figure 1.

Figure 6 is a detail view in perspective of the gate.

Figure 7 is a detail view in elevation of the gate operating rods.

Figure 4:
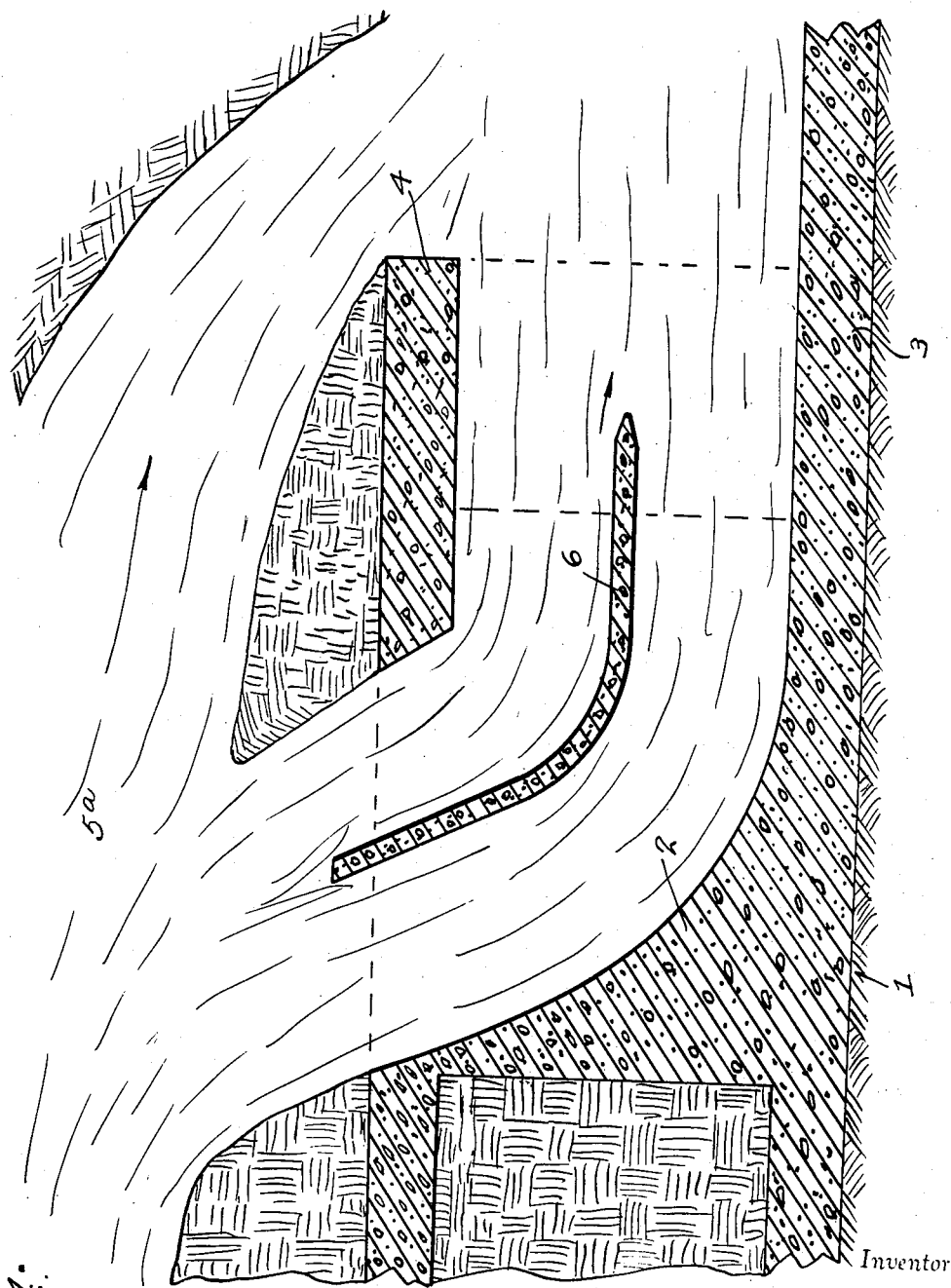
Figure 4 is a view in horizontal section through the sand trap, taken substantially on the line 4—4 of Figure 3.

Referring now to the drawings in detail, it will be seen that the embodiment of the invention which has been illustrated comprises a raceway which is designated generally by the reference numeral 1 and which is constructed of any suitable material, preferably concrete. The raceway 1 includes a floor 2 and side walls 3 and 4, the former extending longitudinally beyond the latter at the intake end of the raceway, as illustrated to advantage in Figures 1 and 4 of the drawings. The side walls 3 and 4 project any desired distance beyond the floor 2 at the discharge end of the raceway 1.

As shown to advantage in Figure 3 of the drawings, the upper surface of the floor 2 of the raceway 1 is inclined toward the forward end of said raceway and said floor is formed to provide a substantially angular sand tunnel 5 which is depressed in the floor 2, said tunnel discharging through the side wall 4. A vertical angular partition 6 divides the tunnel 5 into two passages (see Figure 4). Of course, a portion or all of the concrete may be reinforced if desired or necessary.

The intake end or mouth of the tunnel 5 is controlled by a hingedly mounted gate 7 which is raised or lowered through the medium of a pair of threaded rods 8 which are pivotally connected to said gate at their lower ends. The rods 8 extend slidably through a support 9 which bridges the side walls 3 and 4 and said rods are raised and lowered through the medium of adjusting nuts or wheels 10 which are threaded thereon and which rest on the support 9.

It is believed that the operation of the invention will be readily apparent, particularly to those skilled in the art to which said invention pertains. Water from the river or stream 5a enters the raceway 1 at the intake end thereof and, of course, passes therethrough to the usual irrigation ditch, power plant race, canal or the like. The lower portion of the stream of water entering the raceway carrying the sand enters the tunnel 5 and is returned to the stream of water, as illustrated to advantage in Figure 4 of the drawings, the vertically adjustable hinged gate 7 materially assisting in thus separating or diverting the sand bearing water. When in the position shown in Figure 3 of the drawings, the gate 7 functions as a deflector for directing the sand bearing water into the comparatively restricted passages of the tunnel 5 through which the water flows at increased speed thereby preventing settling of the sand therein.

It is believed that the many advantages of a sand trap constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

A sand trap of the class described comprising a raceway including a bottom and spaced side walls rising from the bottom, a substantially angular integral, depressed tunnel in the bottom communicating with the raceway for receiving sand bearing water therefrom, said tunnel discharging through one side of the raceway and including a vertical, substantially angular partition defining a pair of passages in the tunnel, the intake and discharge opening of said tunnel being of substantially the same cross sectional area, and means for controlling the flow of water through the tunnel, said means including an adjustable gate hingedly mounted on the intake end of the tunnel, a support bridging the side walls, threaded rods pivotally connected to the gate and extending slidably through the support, and adjusting wheels threadedly mounted on the rods and engaged with the support for raising and lowering the gate.

WILLIAM BISHER.